Sept. 8, 1959 L. R. KAHN 2,903,518

RADIO TRANSMISSION SYSTEM

Filed Jan. 21, 1955 7 Sheets-Sheet 1

INVENTOR.
LEONARD R. KAHN
BY Alfred W. Barber
ATTORNEY

Sept. 8, 1959 L. R. KAHN 2,903,518

RADIO TRANSMISSION SYSTEM

Filed Jan. 21, 1955 7 Sheets-Sheet 2

INVENTOR.
LEONARD R. KAHN
BY Alfred W. Barber
ATTORNEY

INVENTOR.
LEONARD R. KAHN
BY Alfred W. Barber
ATTORNEY

Sept. 8, 1959 L. R. KAHN 2,903,518

RADIO TRANSMISSION SYSTEM

Filed Jan. 21, 1955 7 Sheets-Sheet 4

INVENTOR.
LEONARD R. KAHN
BY Alfred W. Barber
ATTORNEY

INVENTOR.
LEONARD R. KAHN
BY Alfred W. Barber
ATTORNEY

INVENTOR.
LEONARD R. KAHN
BY Alfred W. Barber
ATTORNEY

INVENTOR.
LEONARD R. KAHN

BY Alfred W. Barber
ATTORNEY

United States Patent Office 2,903,518

Patented Sept. 8, 1959

2,903,518

RADIO TRANSMISSION SYSTEM

Leonard R. Kahn, New York, N.Y., assignor, by mesne assignments, to Kaiser Industries Corporation, a corporation of Nevada Application January 21, 1955, Serial No. 483,357

21 Claims. (Cl. 179—15)

The present invention concerns radio transmission systems and, in particular, single side-band radio transmission systems.

In order to transmit intelligence by means of radio, a carrier wave is modulated by signals representing the intelligence to be conveyed. The usual amplitude modulation of the carrier results in the production of side-bands extending equally on each side of the carrier. While each of these side-bands actually represents the intelligence to be conveyed, it is usual to transmit both side-bands and the carrier. A considerable saving in power of the transmitted signal can be effected if one of the side-bands and some or all of the carrier is suppressed. The resulting transmission consisting of only one side-band is termed single side-band transmission.

One conventional way to generate a single side-band signal is to generate a standard double side-band and carrier signal and then to select one of the side-bands by means of a band-pass filter. Since it would be very costly to build a band-pass filter of the required characteristics capable of handling a large amount of power it is also conventional to select the desired side-band at low power and then to amplify the resulting single side-band. The amplification after the selection of the side-band must be done with very low distortion or spurious signal will be generated. This low distortion amplification is relatively costly.

The present invention concerns a single side-band system in which the low distortion amplification is not required and hence a considerable saving is effected. According to the present invention, the single side-band after it is selected at a low level is separated into two components. One component is an audio signal representing the envelope of the side-band and the other is a constant amplitude phase modulated radio frequency signal. These two components are amplified separately and combined in the high level modulator stage of a radio transmitter.

According to the present invention it has been found that two different side-bands can be transmitted by the method set forth above. An upper side band may be generated by one side-band generator, a lower side-band may be generated by a second side-band generator and these two side-bands may be combined and a predetermined amount of carrier added to produce a complex double single side-band wave with a floating carrier. This complex wave may be separated into amplitude and phase components which after suitable amplification may be combined in a modulator stage to provide a high power signal simulating the original complex wave. It has also been found that a suitable automatic gain control may be used to keep the average amplitude of the complex wave constant making it possible to transmit radio telephone and similar signals by this method. By controlling the circuit gain ahead of the single side-band filters, distortion and spurious signals generated in the variable gain amplifiers are removed by the filters making possible the transmission of two single side-bands in the same system. Since, the usual radio transmitter requires a signal having a constant average amplitude it has been found possible to provide this condition by utilizing a floating carrier. When the side-bands become small in average amplitude, the carrier is automatically increased to keep the average signal constant. It has also been found that while the automatic gain control of the side-band variable gain amplifiers must have a relatively long time constant to avoid distortion, the gain control of the carrier may have a short time constant thereby providing fast accommodation in the system to varying input signals in keeping the average level of the output signal constant. A system will pass only signals having constant average amplitude unless such a system is capable of passing direct current. Most radio transmitters are incapable of transmitting direct current bias changes. Hence, the importance of fast accommodation of the floating carrier to provide constant average amplitude of signals in the system and at the same time keeping the distortion low.

Furthermore, it has been found that the floating carrier type of transmission outlined above improves the reliability of the system since it renders more stable any automatic frequency control used in receiving the single side-band signals. Thus, when the side-band amplitudes are low, the carrier amplitude is high which prevents the automatic frequency control circuits of the receiver from losing synchronism as they may in conventional systems.

Accordingly one object of the present invention is to provide methods of and means for transmitting two single side-band signals by means of a single radio transmitter.

A further object is to transmit two single side-band signals by means of a single radio transmitter by treating the phase modulation and the amplitude modulation of the complex double single side-band wave independently.

A still further object is to provide a floating carrier in conjunction with two single side-band signals.

Still another object is to control the gain of the floating carrier and of the side-bands by means of a variable gain system having at least two different time constants.

Another object is to control the gain of the carrier and two single side-bands ahead of the single side-band filters.

These and other objects will be apparent from the detailed description of the invention given in conjunction with the various figures of the drawing.

Figure 1:
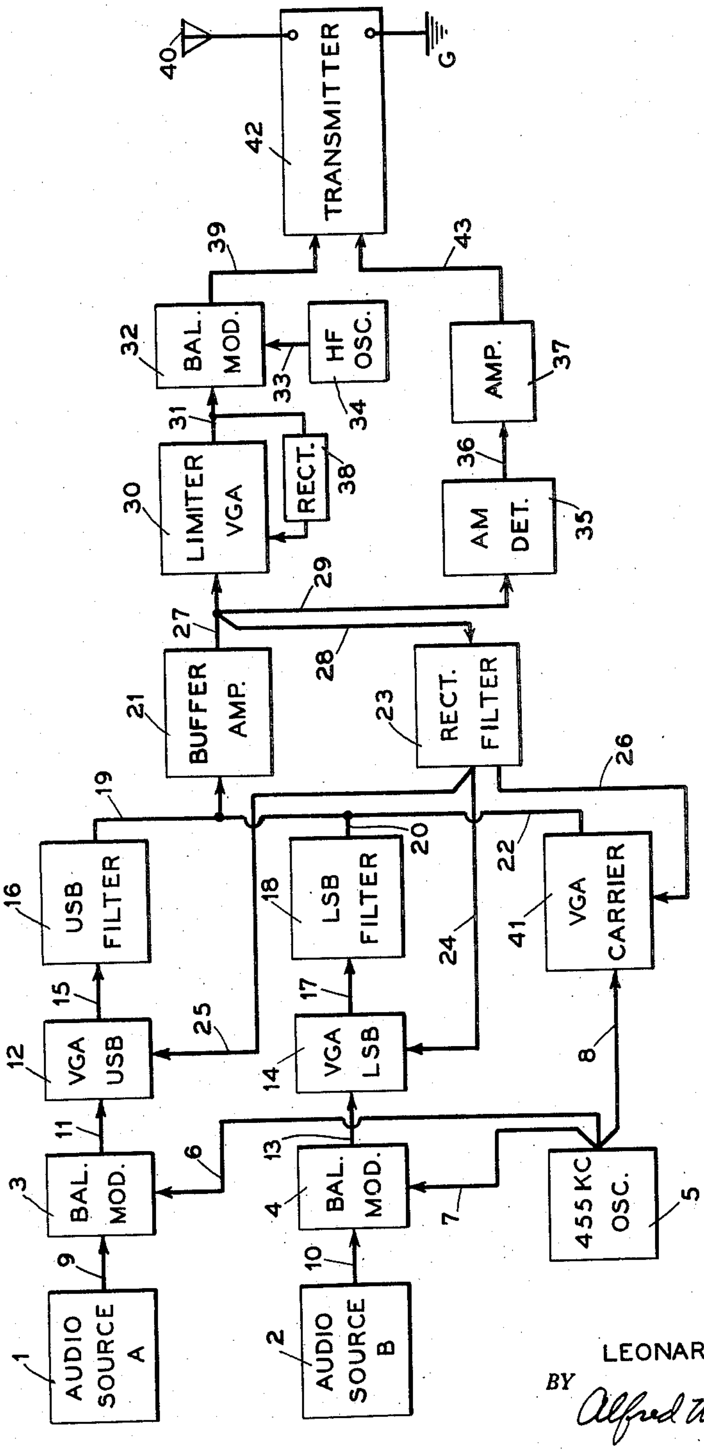
Fig. 1 shows the preferred form of the present invention in block diagram.

Fig. 1 shows an audio signal source 1 which may be any suitable source of audio such as tone signals or telephone signals which it is desired to transmit over one side-band of the double single-sideband system of the invention. A second audio signal of similar type shown at 2 is to be transmitted over the second sideband of the present double single-sideband system. These audio signal sources are applied to balanced modulators 3 and 4 respectively through connections 9 and 10. Also, a carrier signal from a suitable source such as a 455 kc. oscillator 5 is applied to these balanced modulators over connections 6 and 7. The balanced modulator 3 provides two sidebands (upper and lower) around the carrier with substantial suppression of the carrier itself. The balanced modulator 4 provides similar sidebands in accordance with audio signals from source 2. The sidebands from balanced modulator 3 are applied to variable gain amplifier for upper sideband 12, over connection 11 and the controlled amplitude signals provided by variable gain amplifier 12 are applied to upper sideband filter 16 over connection 15. The function of upper sideband filter 16 is to select the upper sideband from the two sidebands generated by balanced modulator 3 and to eliminate the lower sideband and the remainder of the suppressed carrier. Similarly, the sidebands generated by balanced modulator 4 are amplitude controlled in variable gain amplifier for lower sideband 14 to which they are applied over connection 13 and the lower of the two sidebands is selected by lower sideband filter 18 to which the controlled amplitude signals from 14 are applied over connection 17. A carrier signal is applied to the third variable gain amplifier 41 over connection 8 where the amplitude is controlled as will be set forth below. The upper sideband from filter 16 and supplied over connection 19 is combined with the lower sideband from filter 18 supplied over connection 20 and the complex signal thus produced is applied to buffer amplifier 21. The complex signal amplified by buffer amplifier 21 is applied to rectifier-filter 23 over connection 28 where the rectification of the complex signal provides control signals for the variable gain amplifiers 12, 14 and 41 which are supplied over connections 25, 24 and 26 respectively. Further details of the operation of the variable gain amplifiers and the rectifier-filter system are given below.

The signal at the output of buffer amplifier 21 is controlled through the combined operation of variable gain amplifiers 12, 14 and 41 under control of bias signals generated by rectifier-filter 23 so that its average amplitude is constant for all periods greater than a predetermined minimum period. This period should not be greater than the period of the lowest frequency which is passed substantially unattenuated by the modulator of the radio transmitter utilized to transmit the signals provided by the present system. Further details regarding the operation of the gain control system are given below.

The constant average amplitude complex double single-sideband and carrier signal from the buffer amplifier 21 is applied to limiter-variable-gain-amplifier 30 the limiting action of which is enhanced by rectifier 38 and to amplitude modulation detector 35 over connections 27 and 29 respectively. The function of the limiter 30 which may at the same time function as a variable gain amplifier is to remove amplitude variations from the complex signal producing a constant amplitude phase modulated intermediate frequency signal. The function of the amplitude modulation detector 35 is to derive an audio frequency signal representing the amplitude varying envelope of the complex wave signal. The audio frequency signal is applied to amplifier 37 over connection 36 where it is amplified by a predetermined amount and sufficiently to supply the audio signal to the modulator of radio transmitter 42 over connection 43. The audio signal traversing amplifier 37 may be utilized also, to control the gain of variable gain amplifier 30 over a connection not shown to assist the limiting action of this stage in removing the amplitude modulation from the complex signal. While either limiting alone or variable gain effect alone may be used to remove the amplitude modulation, it has been found that the combined limiting and variable gain actions are more effective for the purpose with a given number of stages or a given amount of loop gain.

The constant amplitude phase modulated intermediate frequency signal is applied to balanced modulator 32 over c connection 31 where it is combined with a high frequency signal from high frequency oscillator 34 over connection 33 to provide the desired carrier frequency for the radio transmitter 42 over connection 39. The high frequency signal provided by a balanced modulator 32 will have the same constant amplitude and phase modulation characteristics as the intermediate frequency signal applied to its input. This high frequency constant amplitude phase modulated signal is further amplified in transmitter 42 and supplies the radio frequency excitation for the transmitter. When the envelope representing audio signal is utilized by the modulator of the transmitter 42 to amplitude modulate the constant amplitude phase modulated radio frequency exciting signal, an amplitude modulated signal is produced faithfully reproducing the complex double single-sideband floating carrier signal carried by the buffer amplifier 21. This transmitter signal is radiated by a suitable radiating means such as antenna 40.

Figure 2:
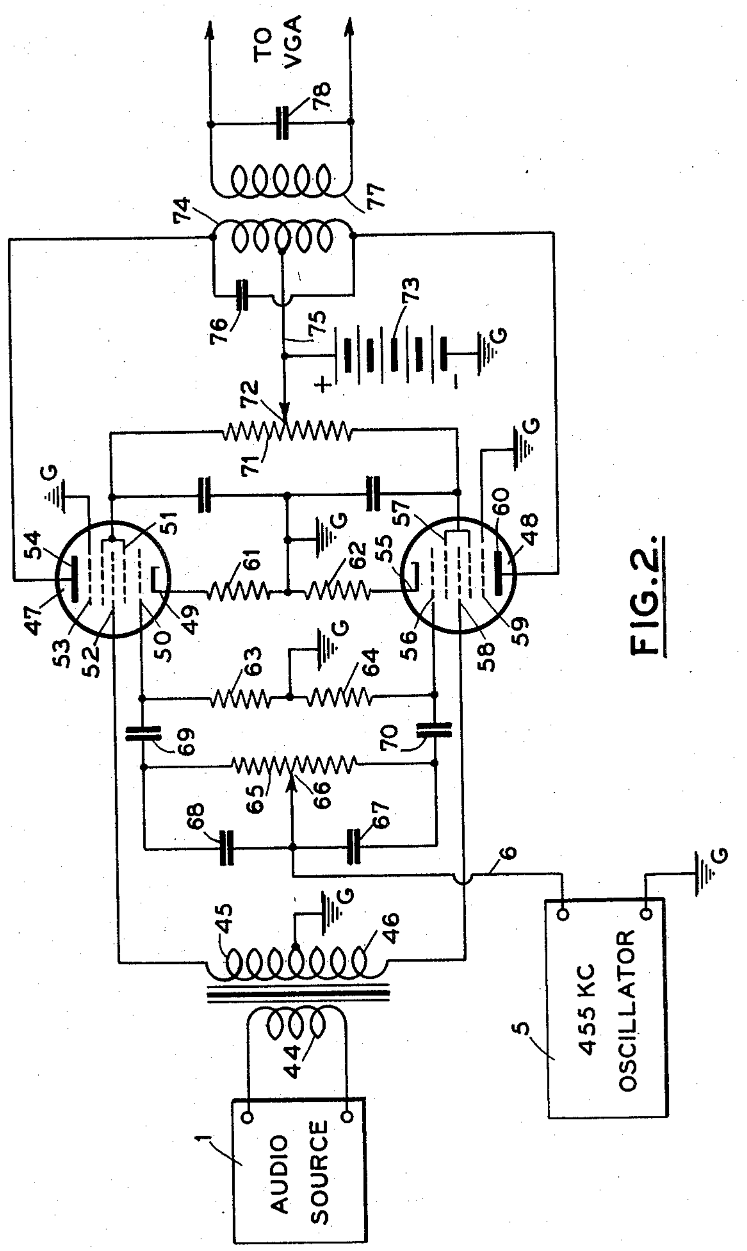
Fig. 2 shows circuit details of one form of balanced modulator suitable for use in the present invention.

Fig. 2 shows circuit details of one form of balanced modulator suitable for use as block 3 or block 4 of Fig. 1. Audio frequency signals from source 1 are fed through an input transformer including primary 44 and center tapped secondary 45—46 to grids 52 and 58 respectively of balanced modulator tubes 47 and 48. Cathodes 49 and 55, heated by conventional means not shown, are self-biased by resistors 61 and 62 returning to ground G. Screens 51 and 57 are supplied with suitable bias voltage from voltage source 73 through opposite sides of potentiometer 71. Suppressor grids 53 and 59 are returned to ground G. First grids 50 and 56 receive substantially equal intermediate frequency signals from 455 kc. oscillator 5 over lead 6 through capacitors 68—69 and 67—70. Grids 50 and 56 are returned to ground for direct current through resistors 63 and 64, respectively. Plates 54 and 60 are connected to opposite ends of balanced output transformer primary 74 tuned by capactior 76 and receiving plate voltage from source 73 over center tap lead 75. Potentiometer 65 connected across capacitors 67 and 68 with the adjustable contact 66 connected to the junction between capacitors 67 and 68 and lead 6 from source 5 is adjustable to operate with capacitors 67 and 68 to adjust the phase of the signals from source 5 placed on grids 50 and 56 for achieving the optimum balance condition. The balance may be further adjusted to optimum by varying the adjustable contact 72 on screen voltage supply potentiometer 71 whereby amplitude correction of the balanced signals is achieved. The output signal induced in secondary 77 tuned by capacitor 78 consists essentially in upper and lower side-bands of audio sum and difference frequencies due to audio source signals around the 455 kc. intermediate frequency, the audio itself, and the intermediate frequency signal being suppressed.

Figure 3:
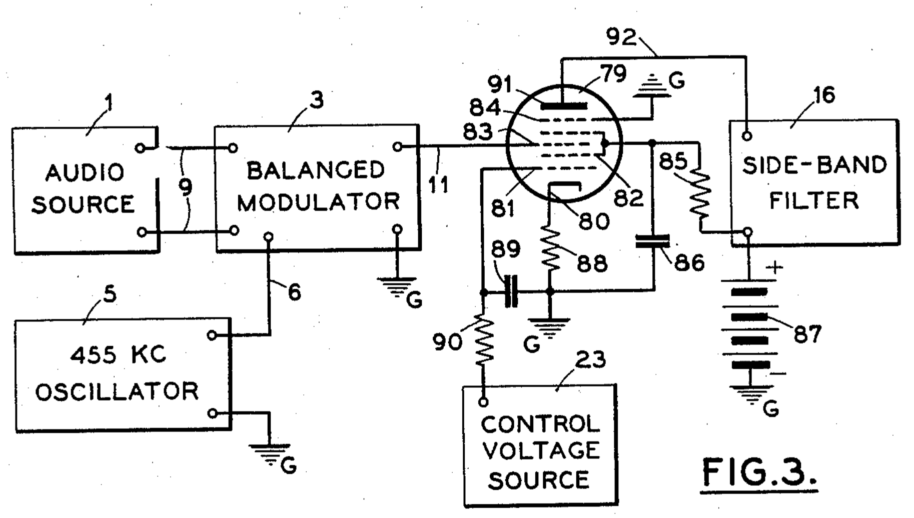
Fig. 3 shows circuit details of one form of variable gain amplifier suitable for use in the present invention.

Fig. 3 shows details of a variable gain amplifier stage suitable for use in the circuit of the present invention. The variable gain amplifier comprises mixer tube 79 including cathode 80, heated by conventional means not shown, first control grid 81, screen grid 82, second control grid 83, suppressor grid 84 and plate 91. The side band signals from balanced modulator 3 are applied to grid 83 over lead 11. Gain control signals from source 23 are applied to grid 81 through filter resistor 90 and across filter capacitor 89 for removing ripple or carrier frequency components. Screen 82 is bypassed by capacitor 86 and receives bias voltage from a suitable source such as battery 87 through decoupling resistor 85. The gain controlled sideband signals pass from plate 91 over lead 92 to side band filter 16. The gain of tube 79 is a function of the bias on grid 81 and hence the amplification applied to the side band signals is under control of the control voltage source 23. The mode of operation of the variable gain amplifiers is more fully explained below.

Figure 4:
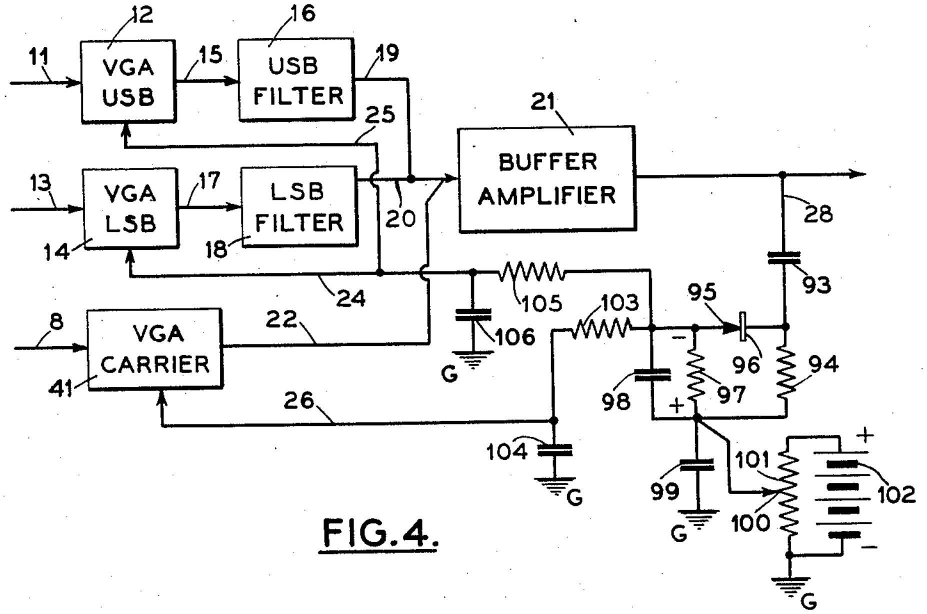
Fig. 4 shows circuit details of a rectifier filter system suitable for use in the present invention.

Fig. 4 shows one particular circuit for controlling the complex single side-band wave to provide constant average amplitude. The output of buffer amplifier 21, the complex wave which consists in the two single side bands from filters 16 and 18 and the controlled carrier component from variable gain amplifier 41, is rectified by applying it to rectifier 95 over lead 28, through coupling capacitor 93 and across resistor 94. The rectified signal voltage is developed across load resistor 97 bypassed by capacitor 98. A delayed rectification of the complex signal is produced by returning the rectifier circuit to an adjustable positive potential provided by a suitable source such as battery 102 bridged by potentiometer 101 the variable arm 100 of which is connected to one end of load resistor 97 and by-passed to ground by capacitor 99. The rectified signal voltage is applied over lead 26 to the carrier variable gain amplifier 41 through a relatively short time-constant filter consisting of resistor 103 and capacitor 104 while it is applied to upper side-band variable gain amplifier 12 and lower side-band variable gain amplifier 14 over leads 25 and 24 respectively and through a relatively long time constant filter consisting of resistor 105 and capacitor 106. In this way a constant average amplitude of the complex signal composed of the upper and lower side-bands may be maintained. Sudden changes in the side-band input levels are quickly compensated by changes in the carrier component due to the short time constant of the carrier control circuit.

Figure 5:
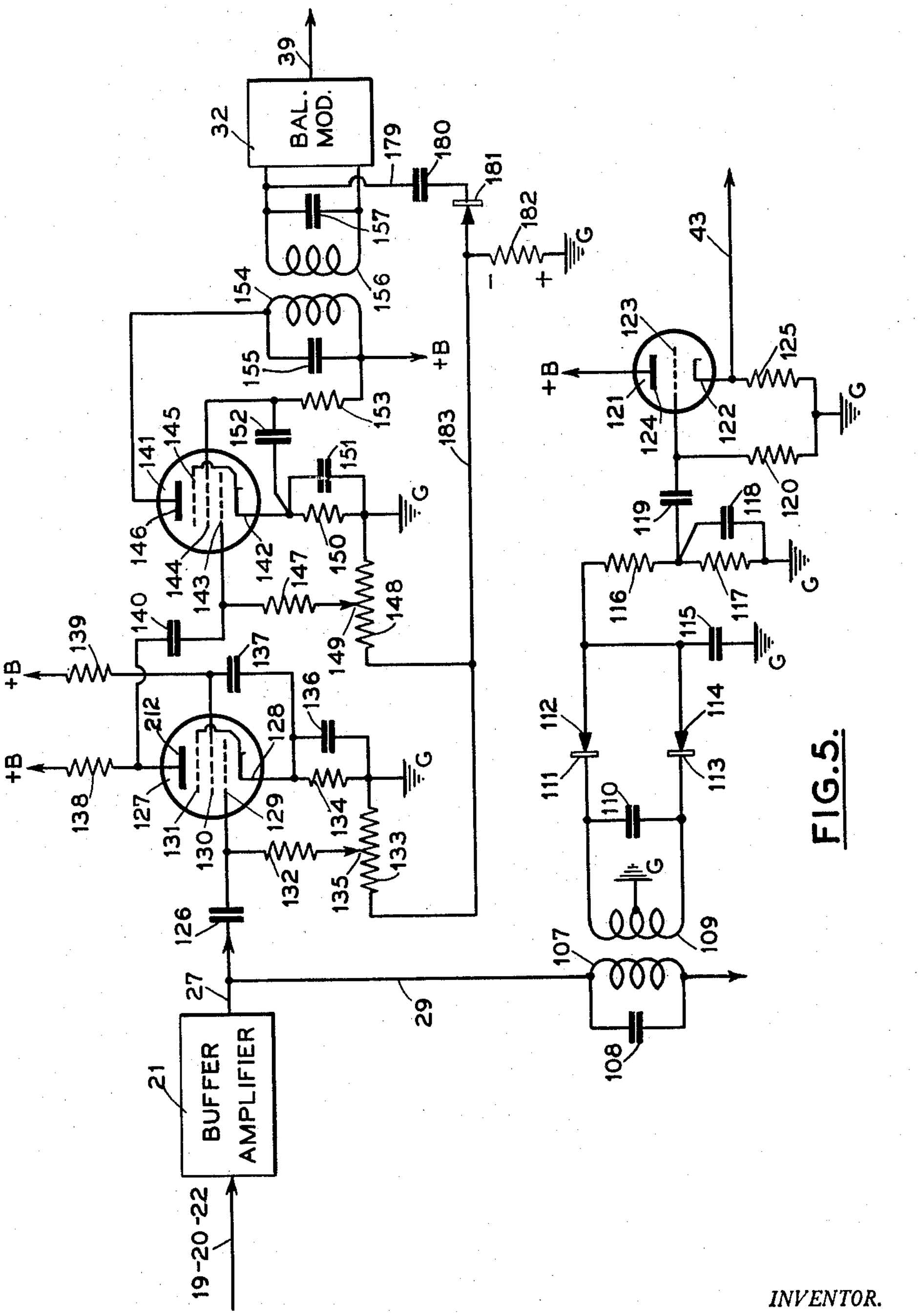
Fig. 5 shows circuit details of a limiter-variable-gain amplifier suitable for use in the present invention.

Fig. 5 shows circuits suitable for generating the amplitude component signal and the limiter amplifier, as shown in blocks 35, 37 and 30 of Fig. 1. Following buffer amplifier 21 are the two limiter tubes 127 and 141 wherein tube 127 includes cathode 128, control grid 129, screen grid 130, suppressor grid 131 and a plate 212 and tube 141 includes cathode 142, control grid 143, screen grid 144, suppressor grid 145 and plate 146. Signals from buffer amplifier 21 are applied over lead 27 through coupling capacitor 126 to control grid 129. Cathode 128 receives a bias from the drop across self-bias resistor 134 bypassed by capacitor 136. Screen grid 130 receives its bias through decoupling resistor 139 and is bypassed by capacitor 137. The signals received by tube 127 appear in amplified form at the plate thereof loaded by resistor 138 and are applied to control grid 143 through coupling capacitor 140. Cathode 142 receives its bias from resistor 150 and is bypassed by capacitor 151. Screen grid 144 receives its bias through decoupling resistor 153 and is bypassed by capacitor 152. The signals traversing tube 141 appear in amplified form at plate 146 and across the plate load consisting of primary 154 tuned to the intermediate frequency by capacitor 155. Plate voltage is supplied to plate 146 through primary 154. Secondary 156 tuned to the intermediate frequency by capacitor 157 receives signal voltage by being coupled to primary 154. The secondary voltage is applied to the input of balanced modulator 32 and the output of balanced modulator 32 is fed to further circuit elements over lead 39. Tubes 127 and 141 with their associated circuits form one suitable form of limiter-variable gain amplifier as shown by block 30 in Fig. 1. In order to provide the limiting action, signal voltage from secondary 156 is applied over lead 179 and through coupling capacitor 180 to rectifier 181 which in turn is returned to ground through load resistor 182. The rectified voltage developed across resistor 182 is applied across potentiometers 133 and 148. Suitable portions of the rectified voltage across potentiometers 133 and 148 are taken off at contact arms 135 and 149 and applied through grid return resistors 132 and 147 to grids 129 and 143 respectively. Since the rectified voltage developed and applied to the grids is negative with respect to ground and increases negatively in accordance with increases in the signal, the gain of tubes 127 and 141 will be decreased for increases in output signal thereby offsetting variations in the input signal and providing a substantially constant output signal. Almost any desired degree of limiting, i.e. constancy of output signal, may be provided in this manner provided the gain in stages 127 and 141 is sufficient. A single stage may be used where less limiting is desired or more than two variable gain stages may be used for greater limiting.

Fig. 5 also shows the AM detector circuit in detail as well as a typical audio amplifier. This circuit shows details of one suitable circuit for blocks 35 and 37 of Fig. 1. The signal voltage before limiting is taken from the output of buffer amplifier 21 and applied over lead 29 to primary 107 tuned to the intermediate frequency and appears across coupled secondary 109 tuned by capacitor 110. The signal voltage across secondary 109, which is center-tapped to ground, is applied to rectifiers 111—112 and 113—114. These rectifiers are loaded by resistors 116 and 117, in series by-passed by capacitor 115. Resistor 116 in series with resistor 117 (which is by-passed by capacitor 118) filters out the intermediate frequency components leaving an audio frequency signal representing the amplitude modulation envelope of the signal from buffer amplifier 21.

This audio signal representing the amplitude modulation component or characteristic of the signal is applied to grid 123 of audio amplifier tube 121 through coupling capacitor 119 and across grid return resistor 120. Plate 124 is connected to a suitable source of "B" voltage and cathode 122, heated by conventional means not shown, is returned to ground through resistor 125 which acts as a self-bias resistor and cathode-follower load. The AM signals amplified by tube 121 are applied to further means over lead 43. As shown in Fig. 1 this further means may be the audio input point of a conventional high level modulation radio transmitter. A phase adjusting device may be interposed between the AM amplifier and the radio transmitter as will be described in more detail in conjunction with Fig. 9.

Figure 6:
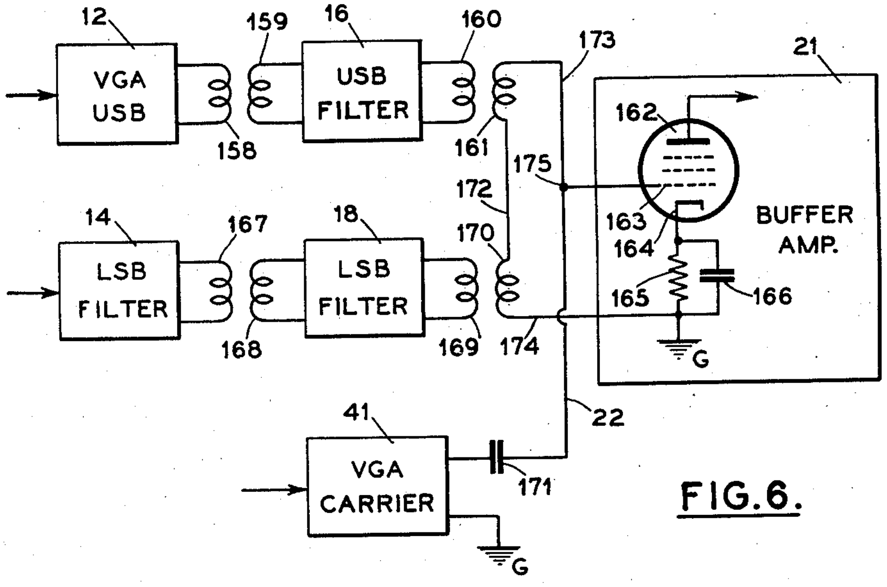
Fig. 6 shows circuit details of sideband filters suitable for use in the present invention.
Figure 7:
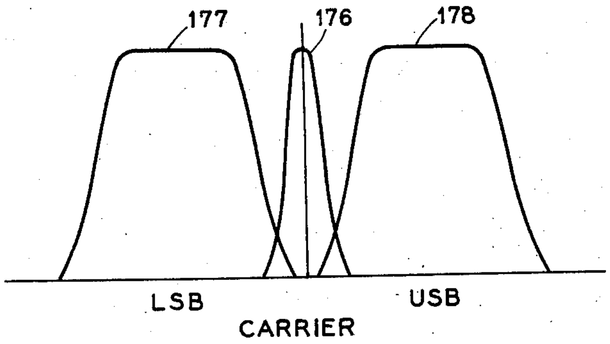
Fig. 7 shows attenuation vs. frequency curves of filters suitable for use in the present invention.

Fig. 6 shows details of filters and buffer amplifier suitable for use in the present invention. Signals from variable gain amplifier for the upper side-band 12 are coupled to the upper side-band filter 16 by suitable means such as intermediate frequency transformer 158—159. The upper side-band filter 16 may be any suitable filter for selecting the upper side-band from the composite signal received. As an example it may be a crystal filter of conventional design having substantially the characteristics shown by curve 178 of Fig. 7. The output of filter 16 which will consist of substantially only the upper side-band of the audio source A and 455 kc. is applied to buffer amplifier 21 by suitable means such as intermediate frequency transformer 160—161. Similarly the lower side-band from signals from the variable gain amplifier for the lower side-band 14 are applied to lower side-band filter 18 over a suitable intermediate frequency transformer 167—168 and the lower side-band thus selected is applied to buffer amplifier 21 through intermediate frequency transformer 169—170 connected so that the lower side-band from 18 is combined with the upper side-band from 16. The lower side-band filter 18 may have any desired suitable characteristic as, for example, that shown at 177 in Fig. 7.

Buffer amplifier 21 may be any suitable intermediate frequency amplifier such as pentode 162. Cathode 164 heated by suitable means, not shown, is connected to ground through self-bias resistor 165 by-passed by capacitor 166. Control grid 163 receives the upper side-band from filter 16, the lower side-band from filter 18 over leads 173 and 174 and carrier voltage from variable gain amplifier 41 through coupling capacitor 171 all combining at junction point 175. Thus buffer amplifier 21 receives a composite signal consisting of an upper side-band representing the audio source 1 (Fig. 1), a lower side-band representing the audio source 2, and the intermediate frequency (455 kc.) carrier. These signals may be shown graphically as the products of the three selectivity characteristics shown as 178, 177 and 176 respectively in Fig. 7.

Figure 8:
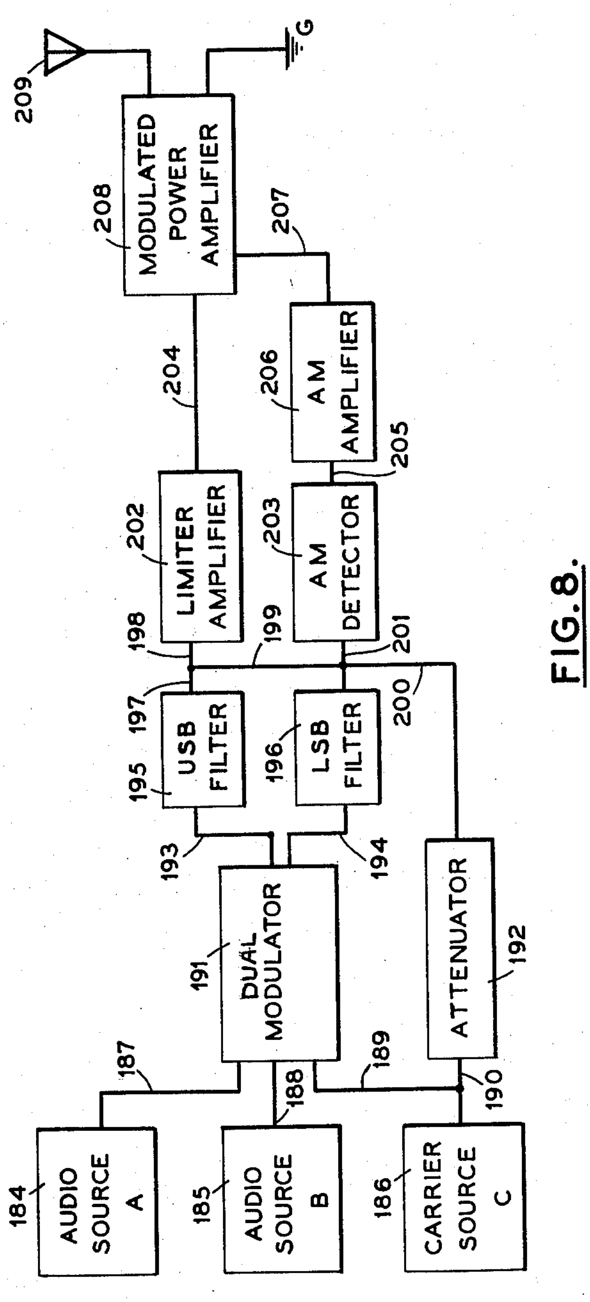
Fig. 8 shows a modified and simplified form of the present invention in block diagram.

Fig. 8 shows a simplified form of the present invention which is useful in certain cases. Aside from the fact that certain automatic controls are eliminated it operates in much the same manner as the preferred form of the invention described in detail above. Audio frequency signals from audio source A184, audio frequency signals from audio source B185 and carrier frequency signals from carrier source C186 are combined in a dual balanced modulator 191. This dual balanced modulator 191 may be similar and equivalent to the two balanced modulators 3 and 4 of Fig. 1. The output of one of the balanced modulators of 191 is fed over lead 193 to upper side-band filter 195 which selects the upper side-band representing the signals from audio source A. The output of the other balanced modulator of 191 is fed over lead 194 to lower side-band filter 196 which selects the lower side-band representing the signals from audio source B. The selected upper side-band is fed over leads 197—198 to limiter amplifier 202 and the lower side-band is added over leads 199—198 as well as a predetermined carrier level determined by attenuator 192 and applied over leads 190, 200, 199 and 198. This composite signal consisting of the upper side-band, the lower side-band and the carrier is also applied to AM detector 203 over lead 201. The AM detector 203 demodulates the composite signal providing an AM signal representing the amplitude modulation characteristics of the composite signal. This AM signal is applied over lead 205 to AM amplifier 206 where it is amplified and then applied to the modulated power amplifier 208 over lead 207. The composite signal applied to limiter amplifier 202 is amplified and limited to remove the amplitude modulation characteristics and the resulting phase modulated radio frequency signal is applied to modulated power amplifier 208 over lead 204 where it provides the radio frequency excitation for the modulated stage. The pure phase modulated signal is amplitude modulated with the AM signal and the resulting signal is radiated by suitable means such as antenna 209.

Figure 9:
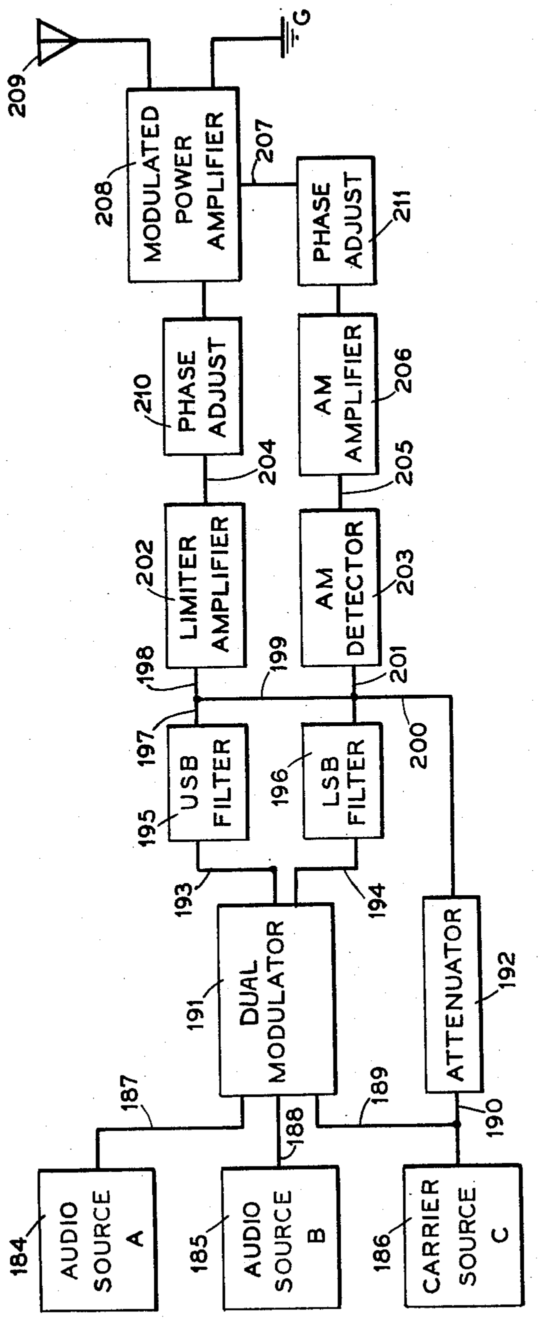
Fig. 9 shows a further modified form of the present invention in block diagram.

Fig. 9 shows a dual single side-band system much like that of Fig. 8 wherein similarly numbered blocks perform the same functions. The system as shown in Fig. 9 includes the addition of phase adjusting means one means 211 in the AM series circuit and another 210 in the radio frequency circuit. These phase adjusting means may be any suitable phase shifting means for equalizing the phase delay between the AM and radio frequency circuits so that when the composite signal is reconstructed in the modulator 208 the phases will be equal. If desired, only the circuit which has the least phase delay may be provided with a phase adjusting device. One typical suitable phase adjusting means is an electrical delay line, another would be an acoustical delay device suitable for AM use. The best delay device for a given use will depend on the frequency of operation and the amount of delay required.

The system of Fig. 1 does not show specific phase adjusting means since such a system may be designed to have equal time delay in both the AM and the radio frequency phase modulated amplifying circuits. However, it may be desired to add phase correction in either of these circuits. Also the modulated power amplifier may have a phase characteristic which requires correction which may be done with phase adjusting means in either circuit as shown in Fig. 9.

While only one preferred system according to the present invention has been described in detail and two possible alternate systems have been shown in block diagram, many modifications will be apparent to those skilled in the art within the spirit and scope of the invention as set forth in the appended claims.

What is claimed is:

1. In a double single side-band system, the combination of, a first source of audio signals, a second source of audio signals, a source of carrier signals, means for modulating a portion of said carrier with said first audio signals to provide a first double side-band signal, means for modulating another portion of said carrier with said second audio signals to provide a second double side-band signal, a filter for selecting the upper side-band from said first double side-band signal, a second filter for selecting the lower side-band from said second double side-band signal, means for combining said upper and said lower selected side-bands to form a composite signal, means for separating the amplitude and phase modulations of said composite signal to form an audio signal representing said amplitude modulation and a radio frequency signal carrying substantially only said phase modulation, amplifying means for amplifying said last said audio signal, amplifying means for amplifying said phase modulated radio frequency signal, and means for modulating said phase modulated radio frequency signal after said amplification with said last said audio signal after amplification to provide an amplified facsimile of said composite signal.

2. In a double single side-band system, the combination of, a first source of audio signals, a second source of audio signals, a source of carrier signals, means for modulating a portion of said carrier with said first audio signals to provide a first double side-band signal, means for modulating another portion of said carrier with said second audio signals to provide a second double side-band signal, a filter for selecting the upper side-band from said first double side-band signal, a second filter for selecting the lower side-band from said second double side-band signal, means for combining said upper and said lower selected side-bands and at least a portion of said carrier to form a composite signal, means for rectifying said composite signal, means responsive to the average magnitude of the rectified signal for automatically controlling the average amplitude of each of said selected side-band signals and said carrier signals to maintain the average amplitude of said composite signal substantially constant, means for separating the amplitude and phase modulations of said composite signal to form an audio signal representing said amplitude modulation and a radio frequency signal carrying substantially only said phase modulation, amplifying means for amplifying said last audio signal, amplifying means for amplifying said phase modulated radio frequency signal, and means for modulating said phase modulated radio frequency signal after said amplification with said last said audio signal after amplification to provide an amplified facsimile of said composite signal.

3. In a double single side-band system, the combination of, a first source of audio signals, a second source of audio signals, a source of carrier signals, means for modulating a portion of said carrier with said first audio signals to provide a first double side-band signal, means for modulating another portion of said carrier with said second audio signals to provide a second double side-band signal, a filter for selecting the upper side-band from said first double side-band signal, a second filter for selecting the lower side-band from said second double side-band signal, means for combining said upper and said lower selected side-bands to form a composite signal, means for separating the amplitude and phase modulations of said composite signal to form an audio signal derived from said amplitude modulation and a radio frequency signal carrying substantially only said phase modulation, amplifying means for amplifying said last said audio signal, amplifying means for amplifying said phase modulated radio frequency signal, means for adjusting the phase of at least one of said amplified signals and means for modulating said phase modulated radio frequency signal after said amplification with said last said audio signal after amplification to provide an amplified facsimile of said composite signal.

4. In a double single side-band system, the combination of, a first source of audio signals, a second source of audio signals, a source of carrier signals, means for modulating a portion of said carrier with said first audio signals to provide a first double side-band signal, means for modulating another portion of said carrier with said second audio signals to provide a second double side-band signal, a filter for selecting the upper side-band from said first double side-band signal, a second filter for selecting the lower side band from said second double side-band signal, means for combining said upper and said lower selected side-bands and at least a portion of said carrier to form a composite signal, means for rectifying said composite signal, means including a relatively long time constant low pass filter for averaging the rectified signal over a relatively long time period for controlling the amplitude of said selected side-band signals, means including a relatively short time constant low pass filter for averaging the rectified signal over a relatively short time period for controlling the amplitude of said at least a portion of said carrier, means for separating the amplitude and phase modulations of said composite signal to form an audio signal representing said amplitude modulation and a radio frequency signal carrying substantially only said phase modulation, amplifying means for amplifying said last said audio signal, amplifying means for amplifying said phase modulated radio frequency signal, means for adjusting the phase of at least one of said amplified signals and means for modulating said phase modulated radio frequency signal after said amplification with said last said audio signal after amplification to provide an amplified facsimile of said composite signal.

5. In a double single side-band system, the combination of, a first source of audio signals, a second source of audio signals, a source of carrier signals, means for modulating a portion of said carrier with said first audio signals to provide a first double side-band signal, means for modulating another portion of said carrier with said second audio signals to provide a second double side-band signal, a filter for selecting the upper side-band from said first double side-band signal, a second filter for selecting the lower side-band from said second double side-band signal, means for combining said upper and said lower selected side-bands to form a composite signal, means for separating the amplitude and phase modulations of said composite signal to form an audio signal representing said amplitude modulation and a radio frequency signal carrying substantially only said phase modulation, amplifying means for amplifying said last said audio signal, amplifying means for amplifying said phase modulated radio frequency signal, means for limiting said amplified phase modulated signal to remove amplitude modulations therefrom, and means for modulating said phase modulated radio frequency signal after said amplification with said last said audio signal after amplification to provide an amplified facsimile of said composite signal.

6. In a double single side-band system, the combination of, a first source of audio signals, a second source of audio signals, a source of carrier signals, means for modulating a portion of said carrier with said first audio signals to provide a first double side-band signal, means for modulating another portion of said carrier with said second audio signals to provide a second double side-band signal, a filter for selecting the upper side-band from said first double side-band signal, a second filter for selecting the lower side-band from said second double side-band signal, means for combining said upper and said lower selected side-bands to form a composite signal, means for automatically controlling the average amplitude of each of said selected side-band signals, means for separating the amplitude and phase modulations of said composite signal to form an audio signal representing said amplitude modulation and a radio frequency signal carrying substantially only said phase modulation, amplifying means for amplifying said last said audio signal, amplifying means for amplifying said phase modulated radio frequency signal, and means for modulating said phase modulated radio frequency signal after said amplification with said last said audio signal after amplification to provide an amplified facsimile of said composite signal.

7. In a double single side-band system, the combination of a first source of audio signals, a second source of audio signals, a source of carrier signals, means for modulating a portion of said carrier with said first audio signals to provide a first double side-band signal, means for modulating another portion of said carrier with said second audio signals to provide a second double side-band signal, a filter for selecting the upper side-band from said first double side-band signal, a second filter for selecting the lower side-band from said second double side-band signal, means for combining said upper and said lower selected side-bands and said carrier signals to form a composite signal, means for automatically controlling the average amplitude of each of said selected side-band signals and of said carrier signals to maintain the average amplitude of said composite signal substantially constant, means for separating the amplitude and phase modulations of said composite signal to form an audio signal representing said amplitude modulation and a radio frequency signal carrying substantially only said phase modulation, amplifying means for amplifying said last said audio signal, amplifying means for amplifying said phase modulated radio frequency signal, and means for modulating said phase modulated radio frequency signal after said amplification with said last said audio signal after amplification to provide an amplified facsimile of said composite signal.

8. In a double single side-band system, the combination of, a first source of audio signals, a second source of audio signals, a source of carrier signals, means for modulating a portion of said carrier with said first audio signals to provide a first double side-band signal, means for modulating another portion of said carrier with said second audio signals to provide a second double side-band signal, a filter for selecting the upper side-band from said first double side-band signal, a second filter for selecting the lower side-band from said second double side-band signal, means for combining said upper and said lower selected side-bands and at least a portion of said carrier to form a composite signal, means for automatically controlling the average amplitude of said composite signal to keep it substantially constant, means for separating the amplitude and phase modulations of said composite signal to form an audio signal representing said amplitude modulation and a radio frequency signal carrying substantially only said phase modulation, amplifying means for amplifying said last said audio signal, amplifying means for amplifying said phase modulated radio frequency signal, means for limiting said amplified phase modulated signal to remove amplitude modulations therefrom, means for adjusting the phase of at least one of said amplified signals, and means for modulating said phase modulated radio frequency signal after said amplification with said last said audio signal after amplification to provide an amplified facsimile of said composite signal.

9. In a double single side-band system, the combination of, a first source of audio signals, a second source of audio signals, a source of carrier signals, means for modulating a portion of said carrier with said first audio signals to provide a first double side-band signal, means for modulating another portion of said carrier with said second audio signals to provide a second double side-band signal, a filter for selecting the upper side-band from said first double side-band signal, a second filter for selecting the lower side-band from said second double side-band signal, means for combining said upper and said lower selected side-bands to form a composite signal, means responsive to the average amplitudes of said audio signals for automatically controlling the average amplitude of each of said selected side-band signals, means for separating the amplitude and phase modulations of said composite signal to form an audio signal representing said amplitude modulation and a radio frequency signal carrying substantially only said phase modulation, amplifying means for amplifying said last said audio signal, amplifying means for amplifying said phase modulated radio frequency signal, and means for modulating said phase modulated radio frequency signal after said amplification with said last said audio signal after amplification to provide an amplified facsimile of said composite signal.

10. In a double single side-band system, the combination of, a first source of audio signals, a second source of audio signals, a source of carrier signals, means for modulating a portion of said carrier with said first audio signals to provide a first double side-band signal, means for modulating another portion of said carrier with said second audio signals to provide a second double side-band signal, a filter for selecting the upper side-band from said first double side-band signal, a second filter for selecting the lower side-band from said second double side-band signal, means for combining said upper and said lower selected side-bands and at least a portion of said carrier to form a composite signal, means for rectifying said composite signal, means responsive to the average magnitude of the rectified signal for automatically controlling the average amplitude of each of said selected side-band signals, means for separating the amplitude and phase modulations of said composite signal to form an audio signal representing said amplitude modulation and a radio frequency signal carrying substantially only said phase modulation, amplifying means for amplifying said last said audio signal, amplifying means for amplifying said phase modulated radio frequency signal, and means for modulating said phase modulated radio frequency signal after said amplification with said last said audio signal after amplification to provide an amplified facsimile of said composite signal.

11. In a double single side-band system, the combination of, a first source of audio signals, a second source of audio signals, a source of carrier signals, means for modulating a portion of said carrier with said first audio signals to provide a first double side-band signal, means for modulating another portion of said carrier wtih said second audio signals to provide a second double side-band signal, a filter for selecting the upper side-band from said first double side-band signal, a second filter for selecting the lower side-band from said second double side-band signal, means for combining said upper and said lower selected side-bands and at least a portion of said carrier to form a composite signal, means for automatically controlling the average amplitude of said composite signal to keep it substantially constant including relatively slowly acting automatic control means for controlling the amplitude of said selected side-bands before said selection and relatively fast acting automatic control means for controlling the amplitude of the last said portion of said carrier, means for separating the amplitude and phase modulations of said composite signal to form an audio signal representing said amplitude modulation and a radio frequency signal carrying substantially only said phase modulation, amplifying means for amplifying said last said audio signal, amplifying means for amplifying said phase modulated radio frequency signal, means for limiting said amplified phase modulated signal to remove amplitude modulations therefrom, and means for modulating said phase modulated radio frequency signal after said amplification with said last said audio signal after amplification to provide an amplified facsimile of said composite signal.

12. In a single side-band system, the combination of a source of intelligence signals, a source of carrier signals, means responsive to both of said signals for producing a single side-band and suppressed carrier signal, first variable gain amplifying means for controlling the amplitude of said single side-band and suppressed carrier signal, means including said source of carrier signal and second variable gain amplifying means for producing a controlled-amplitude carrier signal, means for combining the controlled-amplitude single side-band and suppressed carrier signal with said controlled-amplitude carrier signal to produce a composite signal, and means responsive to a characteristic of said composite signal for individually controlling the gain of each of said first and second amplifying means.

13. In a single side-band system, the combination of a source of intelligence signals, a source of carrier signals, means responsive to both of said signals for producing a single side-band and suppressed carrier signal, first variable gain amplifying means for controlling the amplitude of said single side-band and suppressed carrier signal, means including said source of carrier signals and second variable gain amplifying means for producing a controlled-amplitude carrier signal, means for combining the controlled-amplitude single side-band and suppressed carrier signal with said controlled-amplitude carrier signal to produce a composite signal, means responsive to a characteristic of said composite signal for individually controlling the gain of each of said first and second amplifying means, and means for separating said composite signal into two components one of which represents the amplitude characteristic and the other of which represents the phase characteristic of said composite signal, said phase characteristic component being modulatable by said amplitude characteristic component to produce an amplified facsimile of said composite signal.

14. In a single side-band system, the combination of a source of intelligence signals, a source of carrier signals, means responsive to both of said signals for producing a double side-band and suppressed carrier signal, first variable gain amplifying means for controlling the amplitude of said double side-band and suppressed carrier signal, means including said source of carrier signals and second variable gain amplifying means for producing a controlled-amplitude carrier signal, single side-band filter means responsive to the controlled-amplitude double side-band and suppressed carrier signal for producing a controlled-amplitude single side-band and suppressed carrier signal, means for combining the controlled-amplitude single side-band and suppressed carrier signal with said controlled-amplitude carrier signal to produce a composite signal, means for rectifying said composite signal, and means responsive to said rectified composite signal for individually controlling the gain of each of said first and second amplifying means.

15. In a single side-band system, the combination of a source of intelligence signals, a source of carrier signals, means responsive to both of said signals for producing a double side-band and suppressed carrier signal, first variable gain amplifying means for controlling the amplitude of said double side-band and suppressed carrier signal, means including said source of carrier signals and second variable amplifying means for producing a controlled-amplitude carrier signal, single side-band filter means responsive to the controlled-amplitude double side-band and suppressed carrier signal for producing a controlled-amplitude single side-band and suppressed carrier signal, means for combining the controlled-amplitude single side-band and suppressed carrier signal with said controlled-amplitude carrier signal to produce a composite signal, means for rectifying said composite signal, means responsive to said rectified composite signal for individually controlling the gain of each of said first and second amplifying means, and means for separating said composite signal into two components one of which represents the amplitude characteristic and the other of which represents the phase characteristic of said composite signal, said phase characteristic component being modulatable by said amplitude characteristic component to produce an amplified facsimile of said composite signal.

16. In a single side-band system, the combination of a source of intelligence signals, a source of carrier signals, means responsive to both of said signals for producing a single side-band and suppressed carrier signal, first amplifying means for controlling the amplitude of said single side-band and suppressed carrier signal, second amplifying means for controlling the amplitude of said carrier signal, means for combining the controlled-amplitude single side-band and suppressed carrier signal with said controlled-amplitude carrier signal to produce a composite signal, means for rectifying said composite signal, means responsive to the rectified signal and including a relatively long time constant low pass filter for controlling said first amplifying means, and means responsive to the rectified signal and including a relatively short time constant low pass filter for controlling said second amplifying means.

17. In a single side-band system, the combination of a source of intelligence signals, a source of carrier signals, means responsive to both of said signals for producing a single side-band and suppressed carrier signal, first amplifying means for controlling the amplitude of said single side-band and suppressed carrier signal, second amplifying means for controlling the amplitude of said carrier signal, means for combining the controlled-amplitude single side-band and suppressed carrier signal with said controlled-amplitude carrier signal to produce a composite signal, means for rectifying said composite signal, means responsive to the rectified signal and including a relatively long time constant low pass filter for controlling said first amplifying means, means responsive to the rectified signal and including a relatively short time constant low pass filter for controlling said second amplifying means, and means for separating said composite signal into two components one of which represents the amplitude characteristic and the other of which represents the phase characteristic of said composite signal, said phase characteristic component being modulatable by said amplitude characteristic component to produce an amplified facsimile of said composite signal.

18. In a single side-band system, the combination of a source of intelligence signals, a source of carrier signals, means responsive to both of said signals for producing a single side-band and suppressed carrier signal, first amplifying means for controlling the amplitude of said single side-band and suppressed carrier signal, second amplifying means for controlling the amplitude of said carrier signal, means for combining the controlled-amplitude single side-band and suppressed carrier signal with said controlled-amplitude carrier signal to produce a composite signal, means responsive to the average amplitude of the audio-frequency envelope of said composite signal averaged over a selected time period for controlling the gain of said first amplifying means, and means responsive to the average amplitude of the audio-frequency envelope of said composite signal averaged over a period shorter than said selected time period for controlling the gain of said second amplifying means for relatively rapidly adjusting the magnitude of said amplified carrier signal to compensate for sudden changes in the average amplitude of said single side-band and suppressed carrier signal.

19. In a single side-band system, the combination of a source of intelligence signals, a source of carrier signals, means responsive to both of said signals for producing a single side-band and suppressed carrier signal, first amplifying means for controlling the amplitude of said single side-band and suppressed carrier signal, second amplifying means for controlling the amplitude of said carrier signal, means for combining the controlled-amplitude single side-band and suppressed carrier signal with said controlled-amplitude carrier signal to produce a composite signal, means responsive to the average amplitude of the audio-frequency envelope of said composite signal averaged over a selected time period for controlling the gain of said first amplifying means, means responsive to the average amplitude of the audio-frequency envelope of said composite signal averaged over a period shorter than said selected time period for controlling the gain of said second amplifying means for relatively rapidly adjusting the magnitude of said amplified carrier signal to compensate for sudden changes in the average amplitude of said single side-band and suppressed carrier signal, and means for separating said composite signal into two components one of which represents the amplitude characteristic and the other of which represents the phase characteristic of said composite signal, said phase characteristic component being modulatable by said amplitude characteristic component to produce an amplified facsimile of said composite signal.

20. In a single side-band system, the combination of a source of intelligence signals, a source of carrier signals, means responsive to both of said signals for producing a double side-band and suppressed carrier signal, first variable gain amplifying means for controlling the amplitude of said double side-band and suppressed carrier signal, means including said source of carrier signals and second variable gain amplifying means for producing a controlled-amplitude carrier signal, single side-band filter means responsive to the controlled-amplitude double side-band and suppressed carrier signal for producing a controlled-amplitude single side-band and suppressed carrier signal, means for combining the controlled-amplitude single side-band and suppressed carrier signal with said controlled-amplitude carrier signal to produce a composite signal, means responsive to the average amplitude of the intelligence signals averaged over a relatively long time period for controlling the gain of said first amplifying means, and means responsive to the average amplitude of the intelligence signals averaged over a relatively short time period for controlling the gain of said second amplifying means.

21. In a single side-band system, the combination of a source of intelligence signals, a source of carrier signals, means responsive to both of said signals for producing a single side-band and suppressed carrier signal, first amplifying means for controlling the amplitude of said single side-band and suppressed carrier signal, second amplifying means for controlling the amplitude of said carrier signal, means for combining the controlled-amplitude single side-band and suppressed carrier signal with said controlled-amplitude carrier signal to produce a composite signal, means responsive to the average amplitude of the intelligence signals averaged over a relatively long time period for controlling the gain of said first amplifying means, means responsive to the average amplitude of the intelligence signals averaged over a relatively short time period for controlling the gain of said second amplifying means, and means for separating said composite signal into two components one of which represents the amplitude characteristic and the other of which represents the phase characteristic of said composite signal, said phase characteristic component being modulatable by said amplitude characteristic component to produce an amplified facsimile of said composite signal.

References Cited in the file of this patent

UNITED STATES PATENTS

| | | |
|---|---|---|
| 1,717,064 | Rettenmeyer | June 11, 1929 |
| 2,300,415 | Green | Nov. 3, 1942 |
| 2,421,727 | Thompson | June 3, 1947 |
| 2,666,133 | Kahn | Jan. 12, 1954 |
| 2,752,570 | Hall | June 26, 1956 |
| 2,761,105 | Crosby | Aug. 28, 1956 |
| 2,774,041 | Finch et al. | Dec. 11, 1956 |